INVENTOR
GEORGE E. BARKER
BY
Robert J. Schaap
ATTORNEY

July 15, 1969

G. E. BARKER 3,455,536

SELF-ALIGNING VALVE SEAT

Filed Dec. 27, 1966

INVENTOR
GEORGE E. BARKER

BY
Robert J. Schaap

ATTORNEY

United States Patent Office 3,455,536
Patented July 15, 1969

3,455,536
SELF-ALIGNING VALVE SEAT
George E. Barker, St. Louis, Mo., assignor to Monsanto Company, St. Louis, Mo., a corporation of Delaware
Filed Dec. 27, 1966, Ser. No. 604,793
Int. Cl. F16k *31/06, 1/46*
U.S. Cl. 251—333        12 Claims

ABSTRACT OF THE DISCLOSURE

A conically shaped recess is formed in the end of the valve plunger and a flexible seating ring is disposed therein. The seating ring is retained by a pin which is secured to the lower end of the valve plunger and is capable of extending into the orifice of the magnetic section. The seating ring is sized to circumferentially seat about the orifice formed in the magnetic section. As a specific mode of operation, the valve plunger is continually lowered by magnetic pulses periodically forcing the seating ring into a distorted seating position. A modified form discloses a reverse operating valve where the plunger is magnetically biased to the closed position and employing the same type of seating operation.

---

This invention relates in general to certain new and useful improvements in control valves and more particularly, to an electrically operated control valve which is capable of modulating action and which operates on a force-balance principle.

Recently, the use of electronic instrumentation has grown steadily in the chemical process industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control valves, such as the air-motor control valve was a logical development in chemical process instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure. Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

The presently existing commercially available control valves are not capable of exhibiting a wide degree of utility. For example, the design of these control valves does not lend itself for construction of control valves of laboratory scale, pilot plant scale and commercial scale operation. Moreover, the presently available control valves or final control elements are not capable of being used in other than fluid flow control applications. For example, the presently existing final control elements could not be used in a dual function, such as a control valve and a pressure transmitter, or a transducer or similar type of sensor.

One of the basic problems residing in the presently available control valves, particularly for laboratory use, is that these valves are not capable of effective sealing at low flow rates. This type of problem is particularly pronounced in laboratory size valves where small amounts of leakage can materially affect the results of an experiment or of an operation. In the presently available control valves, the sealing ring or so-called O ring is usually attached in some rigid manner to the movable plunger. The O ring may be stretched over a retaining pin on the plunger. The sealing plane of this sealing ring is determined by the axis of the plunger, which is, in turn, determined by the axis of the tube in which the plunger is enclosed. Furthermore, the seating surface plane is determined by the axis of the section in which the inlet orifice is maintained and is generally welded or brazed to the enclosing tube. This alignment of these two axes by a matter of a few hundredths of a degree often times results in appreciable force required to deform the sealing ring into conformity. Furthermore, even if these axes were perfectly aligned in the manufacture of the valve, variations in the manufacture of the sealing ring cross section would still require a deforming force.

It is, therefore, the primary object of the present invention to provide a self-aligning valve seat, which is capable of effective sealing at very low flow rates.

It is another object of the present invention to provide a self-aligning valve seat of the type stated where sealing is accomplished by both faces of a sealing ring.

It is a further object of the present invention to provide a self-aligning valve seat of the type stated which is capable of being manufactured at a relatively low cost with a high degree of accuracy.

It is an additional object of the present invention to provide a control valve which is capable of modulating flow through a very low flow rate and is also capable of providing effective sealing at low flow rates with conditions of zero leakage.

It is another salient object of the present invention to provide a control valve of the type stated with a self-aligning valve seat, the latter being relatively simple in its operation and having a long operating life.

With the above and other objects in view, my invention resides in the novel features of form, construction, arrangement, and combination presently described and pointed out in the claims.

General description

Generally speaking, the present invention resides in a control valve which is capable of modulating control action by varying the voltage supplied to the coil of the control valve. The valve employed is similar to the type of valve more fully described in my copending application Ser. No. 458,244, filed May 24, 1965, and generally comprises an outer housing having both fluid inlet and fluid outlet ports. A vibratory valve plunger shifts within a guide tube formed within the valve housing and is shiftable with respect to the inlet valve port. The valve plunger is capable of being disposed over the inlet port in sealingwise position when it is desired to eliminate flow through the valve. The valve plunger is ferromagnetic and is actuable by a solenoid coil which is associated with the valve housing and surrounds the plunger.

A control circuit may also be provided for measuring changes in a sensed physical variable and generate a control signal for transmission to the solenoid coil and in which manner the control valve will operate in response to changes of a measured physical variable. This control circuit, however, is more fully described in the aforementioned copending application.

The unique valve seat of the present invention provides a conical seating surface on the underside of the valve plunger which accommodates a sealing ring or so-called O ring. The sealing ring is held in place, but not constrained by, a retaining pin which extends downwardly from the conical surface of the valve plunger. In this manner, there is a limited degree of movement of the sealing ring in the vertical direction with respect to the valve plunger. The sealing ring is adapted to sit over and is slightly diametrally larger than the orifice in the inlet port. Under normal operations, the retaining pin does not contact the inner diameter of the sealing ring and the ring is not constrained by the retaining pin in the plunger except during upset conditions when the outer lip of the pin prevents the ring from dropping away. Sealing is accomplished by both faces of the sealing ring, where one face seals against the flat surface of the magnetic end fitting and the other against the conical surface in the plunger. The movement of the O ring and the conical section thereby provides the self-aligning feature.

The invention also provides a modified form of pulsed-solenoid control valve described in my copending application Ser. No. 487,537, filed Sept. 15, 1965 and which is also capable of employing the unique valve seat arrangement. This latter type of control valve is a reverse acting valve which is normally open and where the plunger is magnetically biased to the closed position.

The present invention also provides a mode of operation where periodic forces are applied to the valve plunger causing the seat to be compressed during periodic force pulses. These force pulses are designed to compress the sealing ring with a greater than necessary force in order to maintain the sealing with the ring in a relaxed condition. The sealing ring is compressed and remains in the sealed position with a sufficient memory until approximately the next force pulse. This continued so-called "rapping" of the sealing ring provides an effective seal between the magnetic fitting and the plunger providing almost perfect sealing with no leakage.

Detailed description

Referring now in more detail and by reference characters to the drawings, which illustrate a preferred embodiment of the present invention, A designates a control valve, which may be similar to the control valve described in my copending application Ser. No. 458,244, filed May 24, 1965 and which is actuable on a pulsed solenoid type of operation. The control valve A is operatively connected to and operable by a control circuit (not shown) which is also more fully described and illustrated in said aforementioned copending application. While the unique seating arrangement of the present invention is illustrated and described in connection with the pulsed solenoid control valve of the aforementioned application, it should be understood that this unique seating arrangement could be employed in any type of valve in which a movable plunger is shifted toward and away from an orifice in optional closurewise position for control of fluid flow.

The control valve A generally comprises an outer valve housing 1 including a somewhat cylindrical coil housing 2. Disposed within the housing 2 is a helically wound cylindrical solenoid coil 3 and disposed upon opposite ends thereof are upper and lower insulating washers 4 and 5, respectively. The insulating washer 5 is facewise disposed upon the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIGURE 1, it can be seen that the springs 8 are interposed between the upper surface of the flux plate 7 and the undersurface of the top wall forming part of the coil housing 2.

Figure 1:
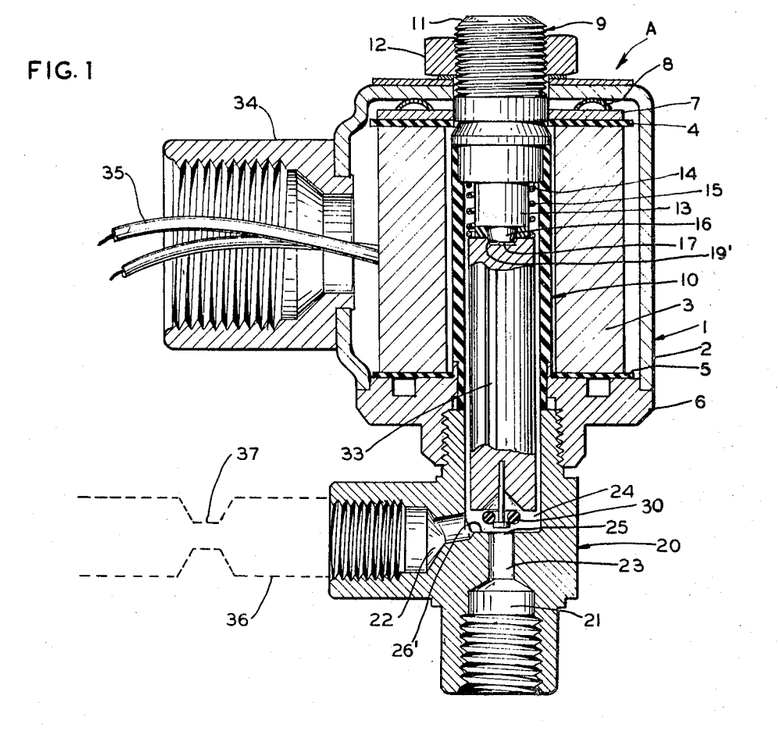
FIGURE 1 is a vertical sectional view, partially broken away of a control valve constructed in accordance with and embodying the present invention.

The coil housing 2 and the solenoid coil 3 are centrally apertured to accommodate a plunger tube assembly 9 which comprises a cylindrical tube 10 disposed axially within the coil housing 2 and which contains a central non-magnetic section surrounded by magnetic sections at each transverse end. Secured to the upper end of the tube 10 is a plug 11 which is retained by a nut 12, substantially as shown in FIGURE 1. The plug 11 projects inwardly into the tube 10 and at its lower end, is diametrally reduced in the provision of a downwardly extending boss 13, thereby providing an annular relief 14 for accommodating a compression spring 15. Integrally formed with and extending downwardly from the lower end of the boss 13 is a projection 16, the lower face of which serves as a plunger stop 17. Reciprocatively disposed within the tube 10 and being adapted for vibratory movement is a valve plunger 18 which is provided with four radially spaced axially extending fluid ducts or reliefs 19. At its upper end, the plunger 18 is milled to provide a plunger head 19'.

Threadedly secured to the lower end of the base plate 6 is a valve body 20 which is axially drilled from its base to form an inlet port 21 and from one transverse end to an outlet port 22. The valve body 20 is also provided with a duct 23 communicating with a fluid chamber 24 formed by the tube 10. Communication is provided therebetween by an orifice 25 formed in an upstanding boss 26 having a flat chamber forming surface 26' integrally formed with the valve body 20. Thus, it can be seen that the fluid inlet port 21 communicates with the chamber 24 through the duct 23 and orifice 25. The outlet port 22 is maintained in communication with the chamber 24 through an axial duct 27 formed in the valve body 20, substantially as shown in FIGURE 1. The fluid ports 21, 22 are also internally threaded to accept standard pipe fittings.

Figure 2:
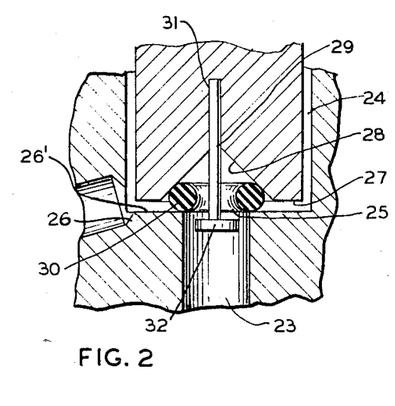
FIGURE 2 is an enlarged vertical sectional view showing the valve seating arrangement forming part of the present invention and the valve in the closed position with the set released.

The plunger 18 is circular in horizontal cross section and is provided with a bottom wall 27' and which is surface machined to provide a conically shaped seating face 28 in the manner as illustrated in FIGURES 1 and 2. The seating face 28 extends inwardly into the valve plunger 18 and has an apex 29, which is coaxially aligned with the axial centerline of the orifice 25. By further reference to FIGURE 1, it can be seen that the outer peripheral margin of the conical seating face is diametrally larger than the orifice 25 and furthermore, the walls forming the seating face 28 are located at approximately a 90° angle. It has been found in connection with the present invention that while the preferable angle of the conical seating face 28 is 90°, it is possible to employ a minimum angle of 45° and a maximum effective angle of approximately 150°.

A flexible sealing ring or so-called O ring 30 is diametrally sized to fit within the conical seating face 28 in the manner as illustrated in FIGURE 2. Furthermore, the sealing ring 30 is circular in horizontal cross section and is sized to extend around the periphery of the orifice 25. In other words, the sealing ring 30 will seal both against the upper face of the boss 26 and against the conical seating face 28. The geometry of the seating arrangement is such that the sealing ring 30 extends around the peripheral margin of the seating face surrounding the orifice 25 for sealingwise contact around the orifice 25 and also is fitted within the conical seating face 28.

The bottom wall 27' of the valve plunger 18 is internally bored at the apex 29 of the conical face 28 for accommodating a retaining pin 31 which extends downwardly below the bottom wall 27' and integrally merges into an enlarged retaining head 32 for retaining the sealing ring 30. The shank of the retaining pin 31 is diametrally smaller than the aperture formed in the center of the sealing ring 30 so that no contact generally exists therebetween and the head 32 is diametrally larger than the aperture formed in the sealing ring 30. However, the head 32 is sufficiently small in diametral cross section so that it extends downwardly into the orifice 25 without any contact therebetween. In other words, the sealing ring 30 is not constrained by the retaining pin 31 in the plunger 18, except during upset conditions when the outer lip of the head 32 prevents the sealing ring 30 from dropping away. Under normal operations, the shank of the retaining pin 31 does not contact the inner diameter of the sealing ring 30. Furthermore, the sealing ring 30 is not constrained axially except by the head 32 of the retaining pin 31 when the ring 30 drops away.

This type of design creates a self-aligning sealing ring where sealing is accomplished by both the upper and lower faces of the sealing ring. It can be seen that one face seals against the flat surface of the magnetic end fitting or boss 26. The other surface of the sealing ring 30 seals against the conical face 28. The movement of the sealing ring 30 along the conical face 28 provides the self-aligning feature. This type of aligning function can be more readily realized by considering the valve plunger axially distorted to a large degree so that one portion of the peripheral margin of the plunger will contact the seating face before another section of the peripheral margin of the plunger. In this case, the sealing ring will be seated along a circular face along the bottom wall of the plunger while the other portion of the sealing ring does not initially provide any effective sealing. In the case of the present invention, the misalignment of the plunger 18, with respect to the top face of the boss 26 does not create any sealing problems since the sealing ring 30 will seat itself in the conical face 28 for effective sealing against the sealing face on the upper surface of the boss 26.

As indicated above, the sealing ring 30 is not constrained axially in the operation of the control valve A. As the balancing force of the magnet is reduced during the pulse cycle, it might be expected that the sealing ring 30 would oscillate between the conical seating face 28 and the upper face of the boss 26. In the actual operation of the device, the sealing ring 30 does not oscillate in this manner except at high flow rates due to the fact that the seal at the conical surface will leak prior to the seal at the upper face of the boss 26 since the contact area is greater at the conical face 28. The sealing ring, therefore, remains sealed against the flat surface of the boss 26 and does not move with the plunger 18. The O ring is sufficiently flexible with a durometer elasticity reading of 80 or less, and is preferably constructed of polybutadiene rubber, such as the type sold under the trademark "Buna-N." Other suitable rubber materials which are capable of being used in the forming of the sealing ring 30 are chloroprene and various polybutadiene-styrene rubbers. Similarly, butadiene-acrylonitrile rubbers are also very useful inasmuch as these rubbers have a great deal of low temperature flexibility. The seating material has a strong effect on secondary or rebound vibrations of a vibrating valve plunger. This is particularly true in pulsed solenoid operations. In general, the secondary vibrations are undesirable inasmuch as they adversely affect the stability of the valve. Moreover, much of the noise associated with pulsed solenoid operation is produced by the secondary or rebound vibrations. In connection with the present invention, it has been found that a soft rubber material of the type employed in this unique valve seat has a sufficiently low elasticity so that the rebound vibrations are negligible.

The valve plunger 18 is also provided with four circumferentially spaced axially extending flutes 33 for permitting fluid flow along the side of the valve plunger 18. The valve A is also provided with a fitting 34 for accommodating a pair of leads 35 to the solenoid coil 3 in the manner as shown in FIGURE 1. The leads 35 are ultimately connected to the control circuit hereinafter described, and which is illustrated and described in the aforementioned copending application for pulsed solenoid type of operation.

Threadedly connected to the outlet port 22 is a discharge line 36 having a diametrally reduced portion 37, which constitutes a fixed orifice or fixed restriction. The discharge line 36 thereafter may discharge to any constant low pressure source. The placing of the fixed orifice 37 on the downstream side of the control valve A produces a unique result of increased stability in that internal feedback or so-called "negative feedback" is produced. It is generally known that positive feedback will produce an increased gain or a dynamic range but reduces the stability of control, particularly in electrical circuits, such as direct-coupled amplifiers. However, a negative feedback may reduce the gain but increases the stability and reduces noise and distortion, when generated in an amplifier. However, it has been found in connection with the present invention that the fixed restriction 37 produces the desired negative feedback which materially increases the stability of the valve. The theory of providing the increased stability by means of the negative feedback is more fully illustrated and described in the aforementioned copending application. Furthermore, it should be pointed out that a flow-to-open pattern is employed in the valve of the present invention. In other words, flow will enter through the port 21 and discharge through the port 22.

Figure 4:
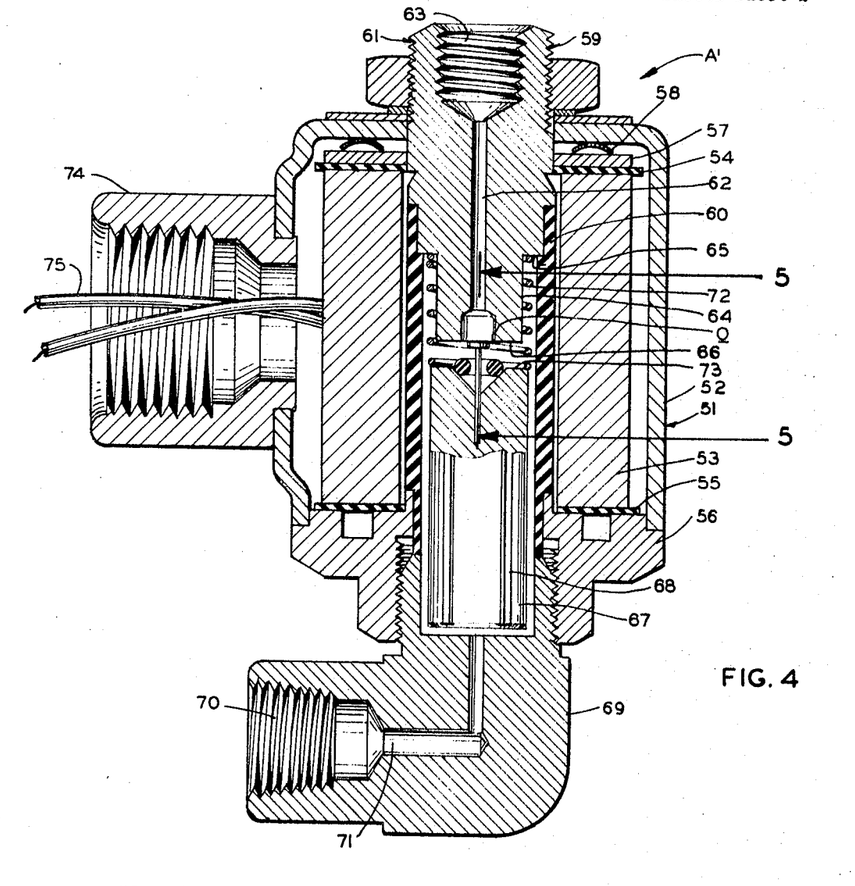
FIGURE 4 is a vertical sectional view partially broken away of a modified form of control valve constructed in accordance with and embodying the present invention.
Figure 5:
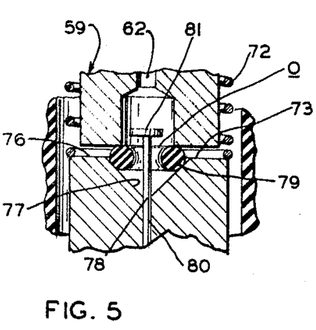
FIGURE 5 is a fragmentary sectional view taken along line 5—5 of FIGURE 4.
Figure 6:
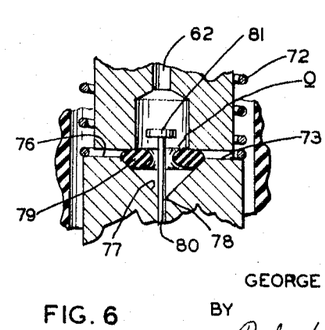
FIGURE 6 is a fragmentary sectional view similar to the sectional view of FIGURE 5 and showing the valve in the closed or no-flow position.
Figure 7:
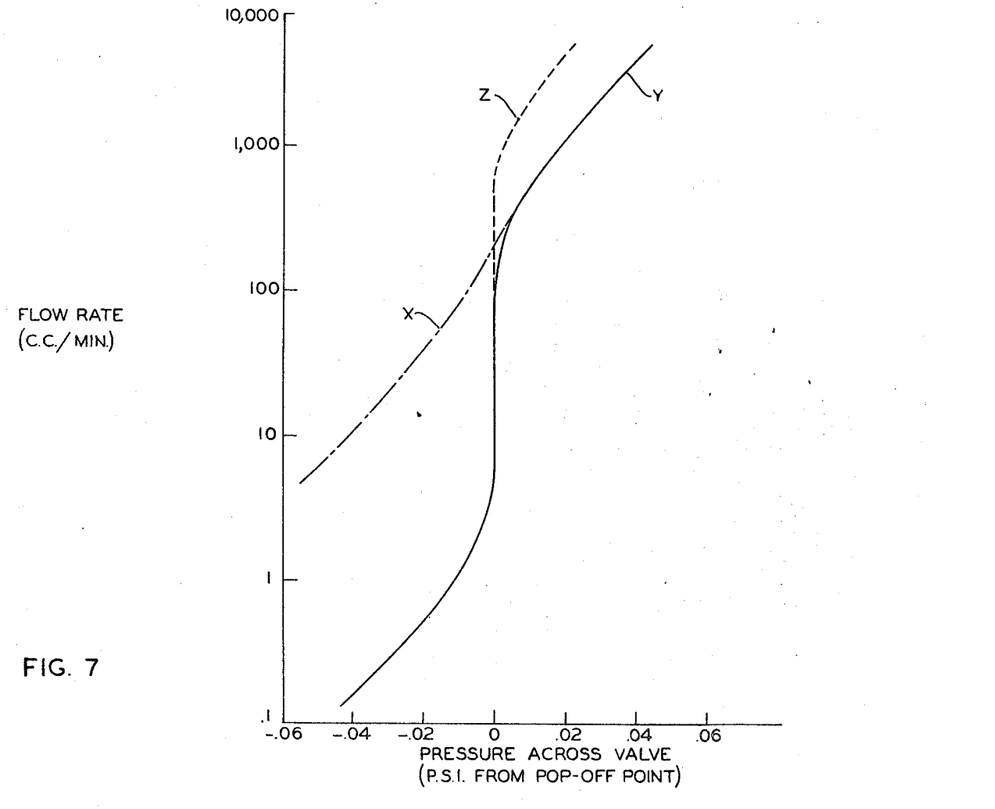
FIGURE 7 is a schematic view of a wave form showing the maximum force effect when sealing pulses are applied to the control valve as a function of time.

The present invention also provides a modified form of control valve A' which is more fully illustrated in FIGURES 4–6, and which is of the reverse acting type described in my copending application Ser. No. 487,537, filed Sep. 13, 1965.

The control valve A' generally comprises an outer control valve housing 51 including a somewhat cylindrical coil housing 52. Disposed within the housing 52 is a helically wound cylindrical solenoid coil 53 and disposed upon opposite ends thereof are upper and lower insulating washers 54 and 55, respectively. The insulating washer 55 is facewise disposed upon the upper surface of a base plate 56 which forms part of the outer coil housing 52. Facewise disposed upon the upper insulating washer 54 is a circular flux plate 57. The assembly of the solenoid coil 53, the insulating washers 54, 55 and the flux plate 57 is suitably held in place and urged downwardly toward the base plate 56 by means of a set of flat springs 58. By reference to FIGURE 1, it can be seen that the springs 58 are interposed between the upper surface of the flux plate 57 and the undersurface of the top wall forming part of the coil housing 52.

The coil housing 52 and the solenoid coil 53 are centrally apertured to accommodate a plunger tube assembly 9 which comprises a cylindrical tube 60 disposed axially within the coil housing 52 and which contains a central non-magnetic section surrounded by magnetic sections at each of the transverse ends. A cylindrical plug 61 is fitted in the upper end of the tube 60 and extends interiorly into the housing in the manner as shown in FIGURE 1. The plug is axially bored in the provision of a fluid inlet channel 62 which communicates with the interior of the cylindrical tube 60. The plug 61 is also integrally provided with an outwardly extending fitting 63 which is internally threaded to accommodate standard pipe fittings. The plug 61 is further diametrally reduced in the provision of a downwardly extending boss 64 forming an annular shoulder 65 for reasons which will presently more fully appear. The boss 64 is further provided with a relatively flat bottom face 66, which serves as an upper plunger stop or seating surface. The fluid inlet channel 62 opens into the tube 10 at the bottom face 66 in the form of an orifice O.

Reciprocatively disposed within the tube 60 and being adapted for vibratory movement therein is a valve plunger 67, which is cylindrical in horizontal cross-section. The plunger 67 is slightly diametrally smaller than the tube 60 in order to permit fluid which flows into the interior of the tube 60 through the inlet port 62 to flow therearound. In order to prevent undue vibration of the valve plunger 67, the plunger 67 is provided with four radially spaced axially extending flutes which are fitted with Teflon spacer strips 68 and which, in turn, are spaced sufficiently from the interior of the wall of the tube 60 in order to permit axial vibratory movement of the plunger but prevent radial vibratory movement thereof. Furthermore, the plunger 67 may be sized to fit snugly but nevertheless shiftably within the tube 60 and may be provided with radially spaced axially extending fluid ducts as desired for permitting fluid flow. The valve plunger 67 is movable between the upper stop 66 and a lower stop 69 formed by a retaining plate secured to the lower end of the tube 60, in the manner as shown in FIGURE 1. The retaining plate 69 is suitably apertured to permit the fluid in the tube 60 to flow outwardly therefrom and into a standard fitting 70 having a discharge port 71. The pipe fitting 70 is internally threaded to accommodate standard pipes or similar fittings in the manner as shown in FIGURE 1.

The valve plunger 67 is biased downwardly by means of a compression spring 72 which bears against the shoulder 65 on the plug 61 and an upwardly presented shoulder 73 formed on the valve plunger 67. In connection with the present invention, it should be understood that the spring 72 is not necessary, but may be employed as desired. The relative merits of employing a spring such as the spring 26 to bias the plunger downwardly is discussed in detail in the aforementioned application. The valve A' is also provided with a fitting 74 for accommodating a pair of leads 75 to the solenoid coil 53 in the manner as shown in FIGURE 1. The leads 75 are ultimately connected which is also described in the aforementioned application.

The valve plunger 67 is circular in horizontal cross-section and is provided with a top wall 76, which is surface machined to provide a conically shaped seating face 77 in the manner as illustrated in FIGURE 4. The seating face 77 extends inwardly into the valve plunger 67 and has an apex 78, which is coaxially aligned with the axial centerline of the orifice O. By further reference to FIGURES 4 and 5, it can be seen that the outer peripheral margin of the conical seating face is diametrally larger than the orifice O and furthermore, the walls forming the seating face are located at approximately a 90° angle. As in the case of the valve A, it has been found that a minimum angle of 45° and a maximum effective angle of approximately 150° can be employed.

A flexible sealing ring or so-called O ring 79 is diametrally sized to fit within the conical seating face 77 in the manner as illustrated in FIGURE 4. Furthermore, the sealing ring 79 is circular in horizontal cross section and is sized to extend around the periphery of the orifice O. In other words, the sealing ring 79 will seal both against the lower face of the plug 61 and against the conical seating face 77. The geometry of the seating arrangement is such that the sealing ring 79 extends around the peripheral margin of the seating face surrounding the orifice O for sealingwise contact around the orifice O and also is fitted within the conical seating face 77.

The top wall 76 of the valve plunger 67 is internally bored at the apex 78 of the conical face 77 for accommodating a retaining pin 80 which extends upwardly above the top wall 76 and integrally merges into an enlarged retaining head 81 for retaining the sealing ring 79. The shank of the retaining pin 80 is diametrally smaller than the aperture formed in the center of the sealing ring 79 so that no contact generally exists therebetween and the head 81 is diametrally larger than the aperture formed in the sealing ring 79. However, the head 81 is sufficiently small in diametral cross section so that it extends upwardly into the orifice O without any contact therebetween. In other words, the sealing ring 79 is not normally constrained by the retaining pin 79 in the plunger 67.

This type of design creates a self-aligning sealing ring where sealing is accomplished by both the upper and lower faces of the sealing ring 79. It can be seen that one face seals against the lower surface of the plug 61. The other surface of the sealing ring 79 seals against the conical face 78. The movement of the sealing ring 79 along the conical face 77 provides the self-aligning feature.

The theory of operation of the reverse acting valve is more fully described in my copending application Ser. No. 487,537, filed Sept. 15, 1965 and is, therefore, not described in detail herein. However, it is pointed out that the valve plunger is normally moved away from the seated position by the force of gravity and any differential pressure force across the valve. It is closed only upon excitation of the solenoid coil and, therefore, fluid flow is only prevented when the valve plunger is shifted to its uppermost position. Nevertheless, the unique seating arrangement described herein, in connection with the valve A is also equally as efficient with the valve A'. Furthermore, the unique seating arrangement operates in a substantially identical manner. No mechanical problems have been created where the conically shaped surface is reversed in its direction and that the seating ring is normally disposed upon the conically shaped surface.

Figure 3:
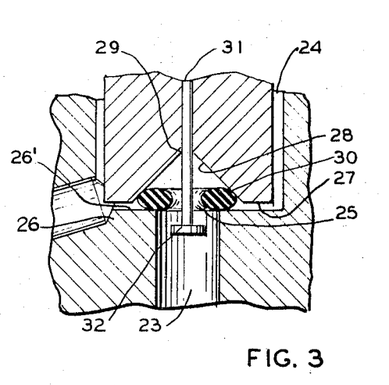
FIGURE 3 is a fragmentary vertical sectional view similar to the sectional view of FIGURE 2 and showing the valve in the closed position with the seating ring in the compressed position.
Figure 8:
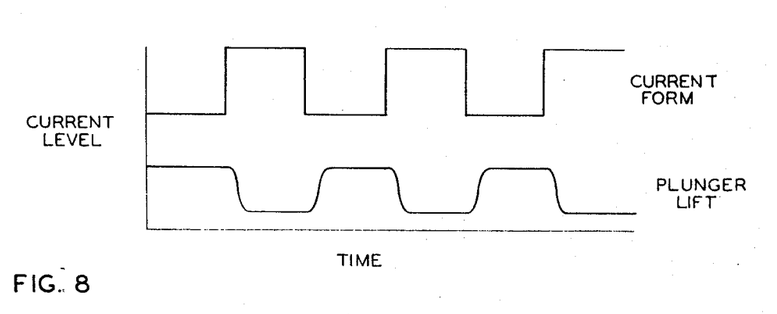
FIGURE 8 is a plot of the pressure from the pop-off point of the control valve as a function of flow rate showing the characteristics of the control valve with the self-aligning valve seat and with a valve having a conventional valve seat.

The theory of the direct acting pulsed solenoid operation is also more fully described in my copending application Ser. No. 412,921, filed Nov. 26, 1964. In the case of the present invention, it has also been found that a series of pulses with quiescent periods between each of the pulses for urging the plunger 18 in the closed position has been found to produce very unique seating results. In addition to the circuit for providing the pulsed solenoid operation, a typical current driver circuit which delivers a square wave current may also be employed for continually applying closing pulses or in essence, "rapping" the valve plunger 18 to the closed or seated position. In the forward acting pulsed solenoid control valve, the valve plunger 18 may be urged to the seated position by a lack of current in the solenoid coil 3. The plunger may then be urged to the seated position by means of the compression spring 15. When the solenoid coil 3 is then energized, the valve plunger 18 is shifted away from the seated position. The method of creating the pulsed solenoid type of operation, however, is not described in detail herein. However, a current driving circuit which delivers the square wave current can be added to this pulsed solenoid source or may be employed separately for urging the valve plunger 18 downwardly into the seated position. This type of current source is more fully illustrated in FIGURE 8 and shows both the plunger lift and the current shape as a function of current level plotted against time. In essence, a plot of the current versus time will show the maximum force effect. In essence, the sealing ring 30 will behave in an ideal fashion if the valve plunger 18 is periodically urged downwardly into the seated position. The square current wave as illustrated in FIGURE 8, will provide the so-called "rapping" effect that is, urging the plunger 18 and the sealing ring 30 into the seated position. This rapping causes the sealing ring 30 to become deformed at each of the increased current levels in the manner as illustrated in FIGURE 3. In fact, it is to be noted that there is a negative plunger lift at each of the increased current levels with a slight time delay between the initiation of the current level and the negative lift of the plunger. Furthermore, there is a delay from the elimination of the increased current level and the time in which the plunger normally assumes its normal undisturbed but seated position in the manner as illustrated in FIGURE 2. Accordingly, the quiescent period existing between each of the maximum forces is sufficient so that the sealing ring 30 begins to approach its undistorted but seated position, but nevertheless does not quite achieve the completely undistorted position before the end of the quiescent period.

It has been found that a quiescent period of approximately 1/10 of a second has been found to produce most suitable results in achieving a sufficient rapping of the sealing ring. The memory effect of the sealing ring is just sufficient so that the ring begins to return to the normal undistorted position but does not achieve this undistorted position prior to the next maximum force. It has also been found that the current drive should operate on approximately 100 milliamps at a minimum level and approximately 250 milliamps at a maximum level. It should also operate on minimum current approximately 9/10 of the time of operation. The force created is designed to overcome the out-of-plane seating of the sealing ring. By employing the constant maximum current pulses, the sealing ring 30 is, in effect, smashed into the upper surface of the boss 26 and sufficiently distorted until the next maximum force pulse. The sealing ring is sufficiently distorted so that it overcomes the out-of-plane seating of the sealing ring.

Figure 9:
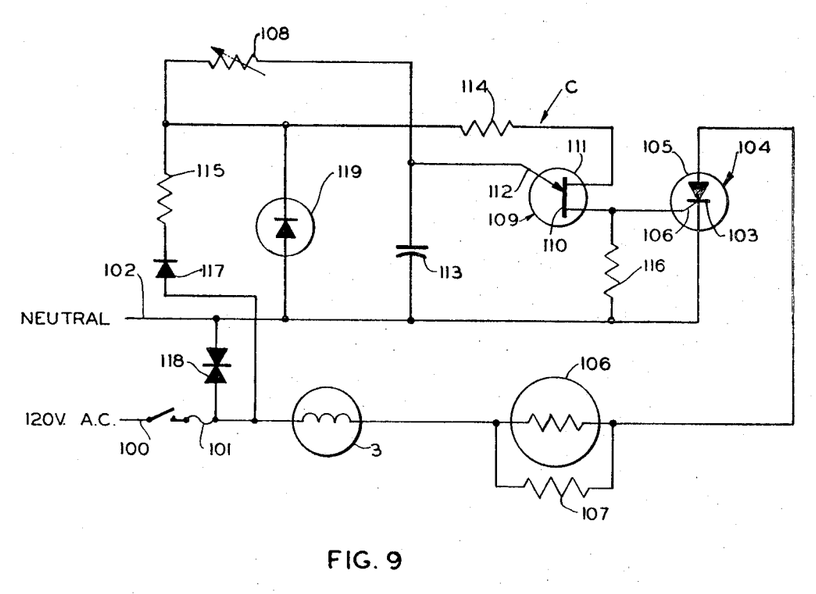
FIGURE 9 is a schematic view of the electrical control circuitry used for operating the control valve of FIGURES 1 and 4.

The control valves A and A' may be operated from a control circuit C as schematically illustrated in FIGURE 9. The circuit C is powered from a 120 volt source of alternating electric current (not shown) and includes a positive conductor 100 which is connected through a fuse 101 to the solenoid coil 3 or 53. The circuit C also includes a neutral conductor 102 which is connected to the cathode electrode 103 of a silicon controlled rectifier 104, the latter also including an anode electrode 105 and a gate electrode 106. The anode electrode 105 of the silicon controlled rectifier 104 is electrically connected through a thermistor 106 to the opposite terminal of the solenoid coils 3 or 53. A fixed resistor 107 is shunted across the thermistor 106 for elimination of undesirable temperature effects.

The firing angle of the basic voltage output of the control circuit C to the solenoid 3 or 53 is, of course, controlled by measured changes in the sensed physical variable, which is schematically illustrated by a variable resistor or so-called "control resistor" 108 in FIGURE 9.

The basic timing device that controls the firing angle of the circuit in relation to the measured change in the physical variable is a unijunction transistor 109 which is used as a relaxation oscillator. The unijunction transistor 109 is provided with a base-1 110, a base-2 111 and an emitter 112. The emitter 112 can be connected directly to the variable resistor 108 and is also connected to a capacitor 113, which is in turn, connected to the neutral conductor 102. The base-2 111 of the transistor 109 is connected through a temperature compensating resistor 114 to a limiting resistor 115 and to the opposite terminal of the variable resistor 108. The base-1 110 of the transistor 109 is electrically connected to the gate electrode 106 of the silicon controlled rectifier 104 and to a fixed resistor 116 which is in turn connected to the neutral conductor 102. The limiting resistor 115 is also connected to the cathode portion of a diode 117 and to the conductor 100. A surge suppressor 118 is connected across the conductors 100, 102 for suppression of transient voltage. A Zener diode 119 is also connected across one terminal of the resistor 114 and the neutral conductor 102, in the manner as schematically illustrated in FIGURE 9.

The control resistor 108 is representative of the function which may be measured. The basic firing angle of the output voltage to the solenoid 3 or 53 is controlled by the changes in the sensed physical variable. Inasmuch as the sensed change of the physical variable is capable of being translated to an electrical change, such as a voltage, current or resistance change, this change can be physically represented by the variable resistor 108.

The unijunction transistor 109 which serves as the relaxation oscillator delivers a current pulse into the gate of the silicon controlled rectifier 104 at a controllable time within the positive cycle of the supply voltage from the source of electrical current. This current pulse is delivered to the gate electrode 106 of the silicon controlled rectifier 104 from the base-1 110 of the unijunction transistor 109. When the rectifier 104 receives this signal it will begin to conduct and will continue to conduct until the current attempts to reverse, at which time conventional diode action stops the current flow. During the negative cycle no action will take place. The operation of the relaxation oscillator uses the principle of the unijunction transistor 109 that conduction between the emitter 112 and base-1 110 is prevented unless the emitter to base-1 voltage is greater than a critical value, that critical value being determined by the base-2 voltage to the base-1 voltage. When this peak voltage is exceeded, the effective resistance between the emitter 112 and the base-1 110 drops and approaches a zero level. Conduction will continue until the emitter to base-1 voltage drops below the valley point voltage.

The diode 117 serves as a half-wave rectifier and provides control voltage for the unijunction transistor 109. The control voltage from the half-wave rectifier 117 is reduced and clipped by the limiting resistor 115 and the Zener diode 119 to produce a square wave voltage form. This square wave control voltage produced by this half-wave rectifying circuit consisting of the diode 117, the resistor 115 and the Zener diode 119, is transmitted both to the emitter 112 and to the base-2 111 through the temperature compensating resistor 114. The capacitor 113 in conjunction with the control resistor 108 determines the firing time of the unijunction transistor 109 and synchronization with the supply of alternating current is obtained by feeding the base-2 111 with the same square wave signal. The charge on the capacitor 113 is initially zero and it will begin to charge by flow of current through the control resistor 108. From the above, it can be seen that the lower the value of the control resistor, the faster will be the charging rate, and hence the rate of voltage rise at the emitter 112 of the unijunction transistor 109.

When the voltage at the emitter 112 reaches the critical value, the unijunction transistor 109 will fire, thereby discharging the capacitor 113 through the resistor 116, permitting current flow into the gate electrode 106 of the silicon controlled rectifier 104. This pulse of current into the gate electrode 106 will cause the silicon controlled rectifier 104 to fire and to begin supply of current to the "load," which consists of the solenoid coil 3. When the control resistance is larger than the critical value, the capacitor 113 will not have charged to the firing voltage by the end of a positive cycle. As the control resistance is decreased from the critical value, the unijunction transistor 109 will fire appreciably earlier than the end of the half cycle, thereby causing the silicon controlled rectifier 104 to conduct for increasingly larger angles. After the unijunction transistor 109 has fired, the capacitor 113 will immediately being to recharge and, if the resistance is low enough, may fire again before the end of the half cycle. However, since the silicon controlled rectifier 104 will already be in the conducting state, this additional pulse caused by the firing of the capacitor 113 will have no effect.

After the silicon controlled rectifier 104 has fired, current will begin to flow in the solenoid coil 3 thereby generating magnetic flux which produces a force on the valve plunger 18. This increasing flux around the coil 3 also produces a back electromotive force which opposes the current flow into the coil 3. As the flux increases, the force on the plunger 18 increases until it balances the spring force holding the plunger 18 to the seated position. At this instant, the plunger begins to move decreasing the air gap, that is the space between the plunger stop 17 and the plunger head 19' and further increases the flux around the coil 3. If a constant voltage were applied to the coil 3, this process would ultimately result in the plunger contacting the plunger stop 17. However, the voltage is reduced continually from the instant conduction has started where the firing angles are less than ninety degrees (90°). Thus, before the plunger 18 has reached the stop 17, the pull exerted by the solenoid coil 3 has been substantially reduced and eventually reaches a zero level, when the silicon controlled rectifier 104 stops conducting. By varying the firing angle of the silicon controlled rectifier 104, both the maximum force and the effective pulse width can be varied for causing changes of the effective valve openings.

The invention is further illustrated by but not limited to the following example, which illustrates the effect of the unique valve seat arrangement as compared to the valve seat described in the aforementioned copending application.

Example 1

This example makes a comparison of the efficiency and dynamic range of a pulsed solenoid control valve which is provided with a conventional valve seat and a pulsed solenoid control valve, which is provided with the unique valve seat arrangement of the present invention. The control valve employed was a modified conventional solenoid valve operating on 24 volt D.C. current and which had a magnetic structure similar to the magnetic structure of the valve described in the examples of my copending application Ser. No. 458,244, filed May 24, 1965. The elements forming the control valve had the following specifications:

Plunger weight ______________________________gms__ 16
Plunger outer diameter _______________________cm__ 0.92
Plunger stop outer diameter ___________________cm__ 0.84
Plunger cross-sectional area ___________________cm.²__ 0.67
Effective axial plunger length _________________cm__ 4.4
Outer shell, outer diameter of plunger _________cm__ 4.1
Outer shell thickness _________________________cm__ 0.159
Orifice diameter ____________________________inch__ ⅛
Air gap when plunger seated __________________do____ 0.055

The solenoid coil of the control valve is characterized by the following data:

DC resistance (including compensator
  resistors) ________________________________ohms__ 90
Coil inner diameter __________________________cm__ 1.35
Coil outer diameter __________________________cm__ 2.98
Coil height _________________________________cm__ 3.15

The valve was constructed of a Type 430F stainless steel.

A control circuit of the type employed in the aforementioned copending application Ser. No. 458,244, filed May 24, 1965 was employed for the operation of the control valve. The discharge pipe connected to the discharge port of the valve has an inner diameter of 0.050 inch. Furthermore, the valve was operated in a flow-to-open pattern.

A differential pressure of 10 p.s.i. at the pop-off pressure was maintained across the valve in one set of experiments and a differential pressure of 10 p.s.i. was then maintained across the valve. The minimum current employed in the closing of the valve plunger was 111.3 milliamps. A series of flow measurements were made as a function of the differential pressure across the valve with the seat design of the aforementioned copending application. The measurements in terms of cubic centimeters per minute of air through the valve were measured in terms of pounds per square inch as the pressure across the valve. Actually, the pressure across the valve was normalized by a reading of the differential pressure divided by the pressure so that the pressure can be read from the pop-off point of the valve itself. The line designated X in FIGURE 8 illustrates the flow characteristic pattern of the valve with the conventional valve seat.

When the valve seating arrangement of the present invention was employed, and a 10 p.s.i. differential pressure normalized from the pop-off point was employed, the curve Y was obtained as a characteristic flow pattern. It can be seen that at high flow rates, the curves X and Y become coincident which would be expected from the operation of the valve. When the differential pressure was increased to 20 p.s.i. normalized from the pop-off point of the valve, the curve Z was obtained, which becomes coincident with the curve Y at the lower flow rates through the valve. The valve seating arrangement employed to obtain the data for the curves X, Y and Z was a conical face formed in the underside of the valve plunger and which face had a 90° taper. Furthermore, the sealing ring was formed of a Buna-N rubber and had an outer ring diameter of 0.20 inch and an inner diameter of .070". The ring retaining pin was constructed of a nonmagnetic material to eliminate radial magnetic force resulting from a magnetic element in the main air gap. The current wave form was a 60 Hz. square wave with the ratio of maximum to minimum current approximately 2.0. The valve inlet was supplied air at 10 p.s.i. and the square wave minimum current was adjusted so that a low flow was obtained and the plunger could be heard to be vibrating.

In the original valve design, the vibration point could not be observed readily so an arbitrary flow of 50 cubic centimeters per minute was selected as the base point. The current level was maintained at this level while the inlet level was gradually lowered measuring the air flow rate from the valve exit. The decrease in pressure from the original 10 p.s.i. is a direct measurement of the sealing force required to reduce the flow rate and hence the flow area to a given level. The following table illustrates the results as well.

TABLE

| Flow rate (cc./min.) | Sealing pressure (p.s.i.) | |
| --- | --- | --- |
| | Conventional valve seat | Present valve seat |
| 50 | 0 | 0 |
| 20 | 0.5 | 0.01 |
| 10 | 0.85 | 0.02 |
| 5 | 1.2 | 0.05 |
| 1 | 2.4 | 0.10 |
| 0.3 | 3.6 | 0.20 |

These data plus the curves plotted in FIGURE 8 well illustrate the effective sealing from the valve seating arrangement of the present invention and show the unique advantage resulting therefrom.

Having thus described my invention, what I desire to claim and secure by Letters Patent is:

1. In a valve having an outer housing with first and second ports for fluid to enter through one of said ports and leave through the other of said ports and a movable plunger shiftably disposed in said housing and being adapted for sealingwise disposition over said first port, the improvement residing in a seating arrangement of said plunger; said seating arrangement comprising a conically shaped end wall formed in the end of said plunger facing said first port, a sealing ring sized to sit over said first port in sealingwise engagement and to be seated against said conically shaped end wall when said plunger is shifted to the position for sealingwise disposition over said first port, said plunger being located in said housing so that the conically shaped end wall in said plunger is aligned with said first port and opposed to said first port when disposed in sealingwise disposition over said first port, said sealing ring being freely shiftable to a limited degree in a transverse direction with respect to a central axis of said plunger and said first port when said plunger is not in sealingwise disposition over said first port, and retaining means preventing radial displacement of said sealing ring beyond said limited degree.

2. The seating arrangement of claim 1 further characterized in that said retaining means is a pin which is secured to the plunger and extending toward said first port from said conically shaped end wall.

3. The seating arrangement of claim 1 further characterized in that said retaining means is a pin which is secured to the plunger and extending toward said first port from said conically shaped end wall, and a retaining head on the free end of said pin, said retaining head being larger than the inner diameter of said sealing ring, said retaining pin and head being sized to extend through said first port when said plunger is in sealingwise position.

4. The seating arrangement of claim 1 further characterized in that said retaining means is a pin which is secured to the plunger and extending toward said first port from said conically shaped end wall, and a retaining head on the free end of said pin, said retaining head being larger than the inner diameter of said sealing ring.

5. The seating arrangement of claim 4 further characterized in that the retaining pin and head is non-magnetic.

6. The seating arrangement of claim 1 further characterized in that said conically shaped end wall has the apex thereof recessed in said plunger.

7. The seating arrangement of claim 1 further characterized in that said conically shaped end wall has an angle ranging from 45° to 150°.

8. The seating arrangement of claim 1 further characterized in that said conically shaped end wall has an angle of 90°.

9. The seating arrangement of claim 1 further characterized in that a flow-to-open pattern is employed in the operation of the valve.

10. The seating arrangement of claim 1 further characterized in that said plunger is normally biased toward the seated position.

11. The seating arrangement of claim 1 further characterized in that said plunger is normally biased away from the seated position.

12. The seating arrangement of claim 1 wherein said sealing ring is substantially freely orientable to a limited degree in substantially all directions with respect to said plunger and said first port when said plunger is not in sealingwise disposition over said first port.

References Cited

UNITED STATES PATENTS

| | | | |
| --- | --- | --- | --- |
| 2,543,010 | 2/1951 | Gardner | 251—129 |
| 2,843,147 | 7/1958 | Penther | 137—487.5 |
| 2,973,007 | 2/1961 | Schutmaat | 251—333 X |
| 3,355,140 | 11/1967 | Andersen | 251—129 X |
| 2,417,494 | 3/1947 | Hoof. | |
| 2,602,627 | 7/1952 | Britton. | |
| 2,655,936 | 10/1953 | Wexler et al. | |

FOREIGN PATENTS

| | | |
| --- | --- | --- |
| 383,713 | 1/1965 | Switzerland. |
| 227,050 | 4/1963 | Austria. |
| 464,506 | 4/1950 | Canada. |

ROBERT W. MICHELL, Primary Examiner

L. G. MACHLIN, Assistant Examiner

U.S. Cl. X.R.

251—129